United States Patent [19]
Mills et al.

[11] Patent Number: 5,754,191
[45] Date of Patent: May 19, 1998

[54] METHOD AND APPARATUS FOR OPTIMIZING PIXEL DATA WRITE OPERATIONS TO A TILE BASED FRAME BUFFER

[75] Inventors: Karl Scott Mills, Lynnwood; Jeffrey Michael Holmes, Seattle; Mark Emil Bonnelycke, Seattle; Richard Charles Andrew Owen, Seattle, all of Wash.

[73] Assignee: Cirrus Logic, Inc., Fremont, Calif.

[21] Appl. No.: 577,988

[22] Filed: Dec. 22, 1995

Related U.S. Application Data

[60] Provisional application No. 60/000,490, Jun. 23, 1995.
[51] Int. Cl.$^6$ ............................................. G06F 13/00
[52] U.S. Cl. ......................... 345/508; 345/191; 345/523
[58] Field of Search .................................... 345/185, 189, 345/191, 201, 507–509, 511, 523; 395/507, 509, 523, 508, 511

[56] References Cited

U.S. PATENT DOCUMENTS

5,170,468 12/1992 Shah et al. ........................... 395/501
5,198,804 3/1993 Mori ..................................... 345/185
5,444,845 8/1995 Cho ...................................... 395/524

*Primary Examiner*—Kee M. Tung
*Attorney, Agent, or Firm*—Steven A. Shaw

[57] ABSTRACT

A method and apparatus for improving pixel data write operations to a tile-based frame buffer. The present invention includes a byte enable first-in first-out register for storing byte enable data for masking pixel data writes to a tile based frame buffer when the pixel data crosses a tile boundary. Pixel data generated by a graphics processor to the frame buffer may traverse multiple tiles. With each 64-bits of pixel data generated, a corresponding byte of byte enable data is generated as mask data for the frame buffer. The byte enable circuit of the present invention may be implemented as a circular shift register to allow the byte enable data to be shifted, rather than being "popped" after the pixel data has been written to the frame buffer. By shifting data rather than "popping" data, the byte enable circuit is able to retain portions of the byte enable data to enable a correct write of a pixel word which may traverse tile boundaries.

21 Claims, 9 Drawing Sheets

METHOD AND APPARATUS FOR OPTIMIZING PIXEL DATA WRITE OPERATIONS TO A TILE BASED FRAME BUFFER

CROSS-REFERENCE TO RELATED APPLICATION

The present application claims priority from Provisional Application Ser. No. 06/000,490 entitled "Byte Enable FIFO Architecture" filed Jun. 23, 1995.

BACKGROUND OF THE INVENTION

1. Field of the Invention

The present invention relates to computer graphics systems, and, more specifically to an apparatus and a method to optimize writing of graphics data to a tile-based frame buffer.

2. Description of Related Art

In a computer system with graphics capabilities, a graphics controller executing graphics applications may output data representing an image to be displayed on a display screen. Such data may be frequently stored in data buffering units known as First-In First-Out (FIFO) buffers by the graphics controller prior to writing the data to a frame buffer which contains all of the graphics data representing an image to be displayed on the display device.

The frame buffer defines the screen display and may be frequently updated by rewriting its storage specification in part or completely, either to reflect dynamic aspects of the display or to provide for the display of images generated from a different application program. It is also frequently necessary to mask areas of the frame buffer such that those areas are not overwritten by subsequent graphics operations.

In masking the frame buffer, byte enables may be used to control write operations to the frame buffer and also to define data masks for the frame buffer. Each byte of pixel data generated by a graphics controller for a graphics operation has byte enable information associated with it to determine whether a particular pixel data will actually get written to the frame buffer.

Many prior art graphics controllers typically include a pixel path which may be several pixels wide to allow processing of several pixels of data during each clock cycle in the graphics controller. Processing several pixels of data during each clock cycle implies that the byte enable output during each clock cycle may also be several bits wide (e.g., if the pixel path is 64 bits wide and the pixel depth is 8 bits, then 8 pixels may be generated on every clock).

Such prior art graphics controllers may also include a data First-In First-Out (FIFO) register which may be used to store pixel data generated by the graphics controller until the frame buffer is ready for a write. Having a data FIFO requires the graphics controller to include a byte enable FIFO to store the byte enable information associated with each of the pixel data being written to the frame buffer prior to the data being sent to a display unit.

Figure 1:
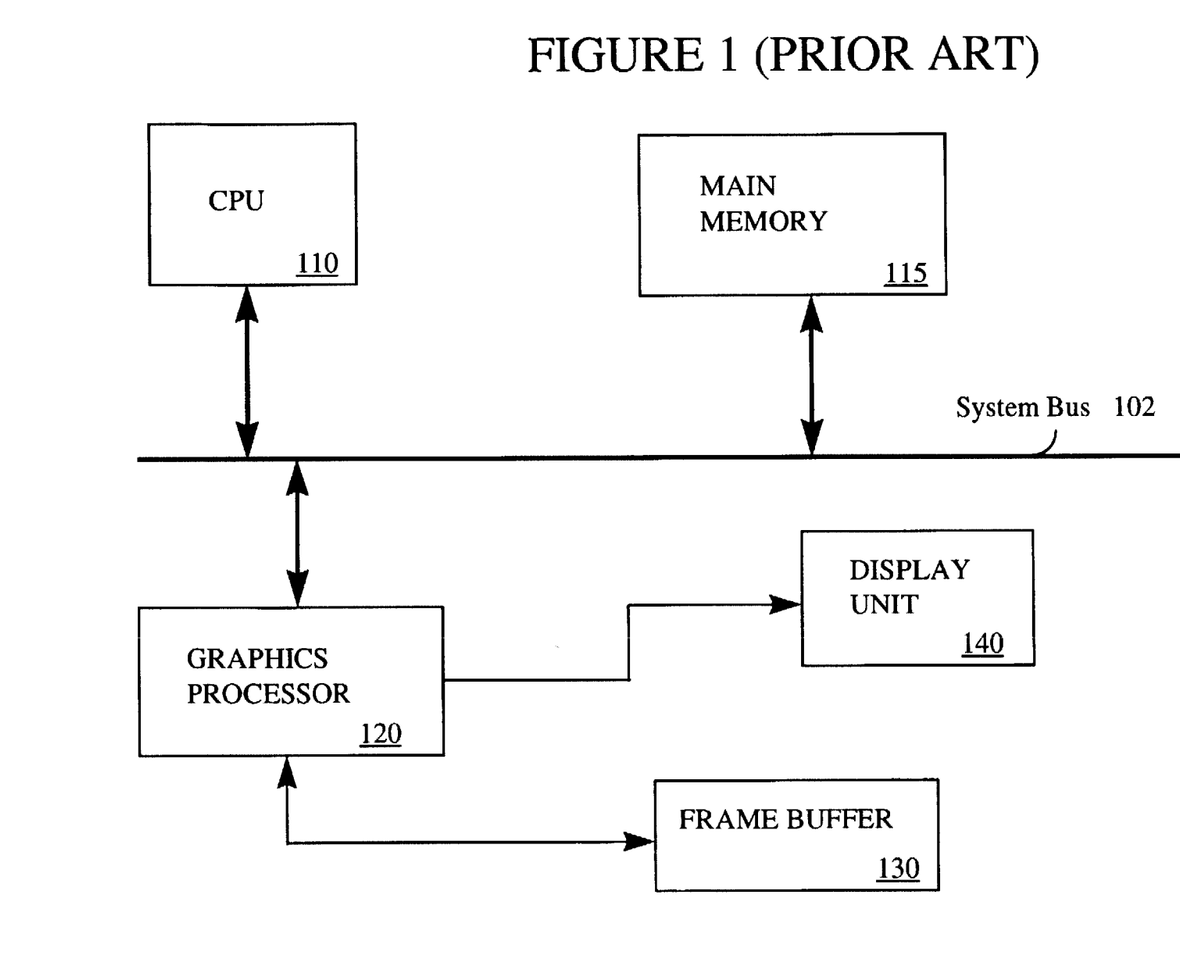
FIG. 1 is a simplified block diagram of a computer system comprising a central processor, a graphics processor, a frame buffer, and a display device.

FIG. 1 is a block diagram of a computer system having a graphics system utilizing a frame buffer of the prior art. The graphics system includes a graphics processor 120. Computer system 100 includes a central processing unit (CPU) 110 for processing data and instructions, main memory for storing data and instructions, graphics processor 120, frame buffer 130, and display unit 140.

System bus 102 may be any one of a plurality of different types of host or input/output (I/O) buses including the Industry Standard Architecture (ISA), the Peripheral Component Interconnect (PCI), etc. Graphics processor 120 is preferably a 64 bit graphics processor coupled to a 32-bit system bus via a host interface (not shown).

Graphics processor 120 may include a display path which receives digital data stored in frame buffer 130 and converts such data into appropriate analog outputs required by display unit 140. Graphics processor 120 also controls write operations of graphics data to frame buffer 130.

Commands received from CPU 110 may specify operations such as a move display block operation which may indicate to graphics processor 120 to move a block of display data from one area (hereinafter referred to as a source block display) of display unit 140 to another area (hereinafter referred to as a destination block display).

To display data on the display unit, prior art graphics systems display implementations typically have two modes of operation, scan line oriented and tile oriented modes. In a scan line oriented operation, the graphics controller may generate and store data in sequential order as it will appear line-by-line on the display device. Data representing display images in the frame buffer may be read out from the frame buffer to the display device in serial order bit-by-bit, or line-by-line. In the tile oriented mode, the display device may be divided into a grid of rectangles of equal size and shape known as tiles. Blocks of data representing an image to be displayed are moved into each tile.

The prior art system shown in FIG. 1 may utilize a tile based frame buffer for storing graphics data processed by graphics processor 120. Frame buffer 130 may be divided into areas of equal size to allow frame buffer 130 to be accessed in packets based on the tile size. The tile size may vary depending on the physical structure of frame buffer 130.

Each packet of data to be written to frame buffer 130 may comprise a number of bytes of result data and associated byte enables. Typically, most write operations to frame buffer 130 may not cross tile boundaries which allows graphics processor 120 to perform a graphics operations to frame buffer 130 without incurring extra clock cycles.

However, some graphics operations may encounter problems of having to span a tile boundary (i.e., in the X direction or the Y direction) in frame buffer 130, graphics processor 120 may therefore have to write data to multiple tiles in frame buffer 130 in order to move a block of pixel data from a source area to a destination area. Writing to multiple tiles requires graphics processor 120 to initiate multiple packet requests to multiple tiles of frame buffer 130 to write result data. An example of the problem faced by graphics processor 120, in the prior art, in trying to write graphics data that cross tile boundaries is illustrated in FIG. 1B.

Figure 1B:
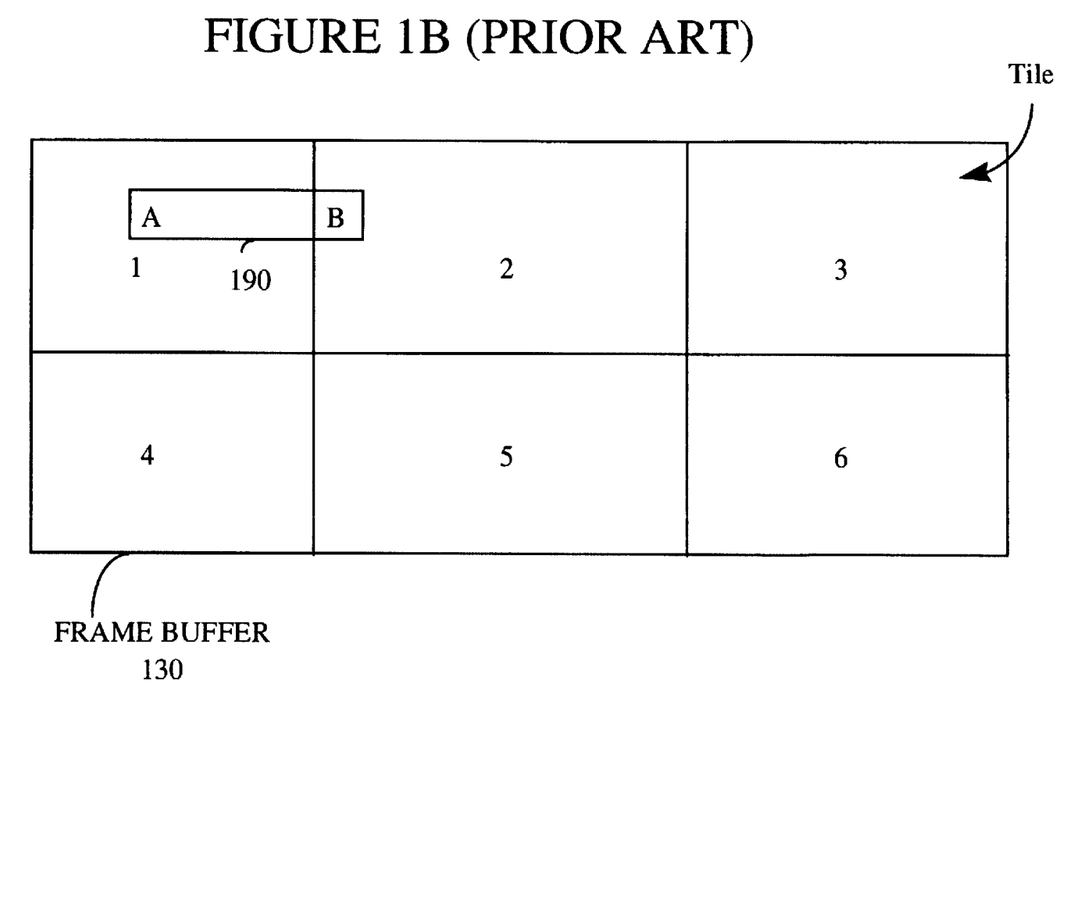
FIG. 1B is a simplified diagram of the tile-based frame buffer illustrating the problem associated with writing data spanning a tile boundary in the prior art.

If a line of data 190 crosses a tile boundary in the X direction as illustrated in FIG. 1B (i.e., tiles 1 and 2), the line of data 190 crossing the X tile boundary between tiles 1 and 2 may need to be written to memory as two separate packets of data due to the fact that tiles 1 and 2 may be in two physically different areas of frame buffer 130.

These two write packets are represented in FIG. 1B as A and B. The first packet request reads the first word containing the first 8 pixels (8 bytes) from the graphics processor 120 and reads the first word containing the nine bits of byte enable data from a byte enable storage location. The pixel data is stored to the frame buffer using the byte enable data as masking information.

The second packet request reads the second word containing the ninth pixel from graphics processor 120 and may want to store the data to B without affecting the rest of tile 2. However, since the first packet request has already read the first word containing all nine bits of byte enable data from the byte enable storage location, the second packet request either has no byte enable data, if the first word has been popped from graphics processor 120, or the byte enable data is invalid if the word of byte enable data is reused. This results in corruption of the frame buffer 130.

In order to solve the problem with the prior art illustrated in FIG. 1B, a system is needed which guarantees valid byte enable data for every packet request.

SUMMARY OF THE INVENTION

The principles of the present invention are embodied in a novel graphics processor architecture which provides for the storing of data representing pixel information with associated byte enable information in a tile based frame buffer without overwriting data already written to a particular tile location in the frame buffer when the pixel data is of such length that it traverses multiple tiles in the frame buffer. The present invention enables the pixel data to be written to the frame buffer in one or more packets when the pixel data traverses a tile boundary in the frame buffer without corrupting the frame buffer due to incorrect byte enable data.

The graphics processor of the present invention includes byte enable data first-in-first-out storage units for storing byte enable data associated with each word of pixel data written to the frame buffer. The storage units include circuitry which enable the byte enable data to be popped out of or shifted in the storage units in response to write requests by the frame buffer. The byte enable data is used as masking information to determine whether data stored in the frame buffer should be overwritten or not.

The byte enable storage units of the present invention also include pop and shift pointers each loadable with pointer information to identify which byte enable data may be driven out, or shifted within the storage units respectively. The pointer information may be updated as new data is written into the storage units or written out of the storage units. A plurality of logic gates are also provided to store load and write enable information to indicate whether new data may be loaded into the storage units or whether previously stored data may be retained in the storage units during a write operation to the frame buffer.

The present invention solves the problem of prior art system's inability to retain byte enable data when pixel data being written to the frame buffer traverses a tile boundary requiring the data to be written in more than one packet. The present invention retains the byte enable data by utilizing the shifting logic to shift the byte enable data in the storage units until the entire information representing the pixel data being written is completed.

During a packet request crossing tile boundaries in the frame buffer which may require data to be written in, for example, two packets, each time data is read from the storage units, data in the byte enable units is shifted to the right by one byte after being used for writing the first packet representing a portion of a line. This guarantees that byte enable data will always be valid at the beginning of a subsequent packet request.

The byte enable data is subsequently aligned to enable the second packet transaction of the line to be written to the frame buffer. Byte data representing pixel information to be stored in the frame buffer is popped off the byte enable storage unit after the data representing the entire line has been written to the frame buffer.

Advantages of the present invention include enabling pixel data representing single or multi-line operations that cross tile boundaries to be written to one or more locations in a tile-based frame buffer without losing any byte enable data associated with the pixel data. The present invention also has the advantage of having multi-line pixel data to be processed to the frame buffer without incurring extra clock cycles experienced in the prior art.

The foregoing and other features, aspects and advantages of the present invention will become more apparent from the following detailed description of the present invention when taken in conjunction with the accompanying drawings.

DETAILED DESCRIPTION OF THE PREFERRED EMBODIMENT

In the following detailed description of the present invention, numerous specific details are set forth in order to provide a thorough understanding of the present invention. One skilled in the art will readily recognize from the following discussion that alternative embodiments of the structures and methods illustrated herein may be employed without departing from the principles of the invention. In the present invention, the graphics processor may minimize the number of data accesses to a tile-based frame buffer during a write to a display device if such write operation crosses a tile boundary in a frame buffer.

Figure 2:
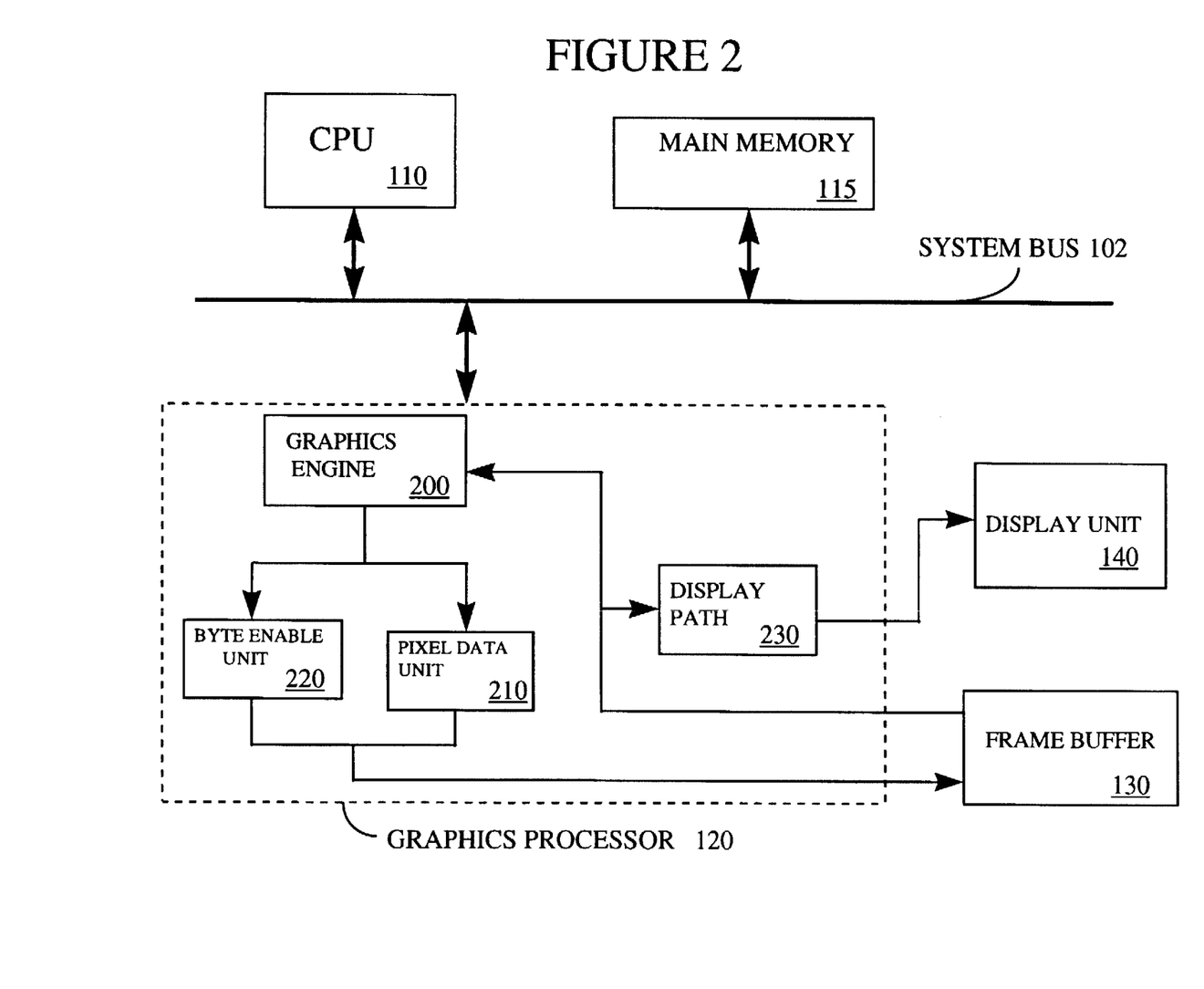
FIG. 2 is a simplified block diagram of a computer system comprising a central processor, a graphics processor, and a tile-based frame buffer of the present invention.

FIG. 2 is a block diagram of a computer system having a graphics system utilizing a tile based frame buffer of the present invention. Computer system 100 includes a central processing unit (CPU) 110 for processing data and instructions, graphics processor 120, frame buffer 130, and display unit 140. Computer system 100 also includes system bus 102 for communicating data and instructions to and from the various components of computer system 100 and CPU 110.

Graphics processor 120 is preferably a 64 bit graphics processor coupled to a 32-bit system bus via a host interface (not shown). Graphics processor 120 may include a graphics engine 200 for generating graphics data to be displayed in display unit 140, a pixel data storage unit 210 coupled to graphics engine 200 to temporarily store pixel data to be displayed, a byte enable storage unit 220 coupled to graphics engine 200 for storing mask data associated with the pixel data, a display path 230 coupled to graphics engine 200 which receives digital data stored in frame buffer 130 and converts such data into appropriate analog outputs required by display unit 140. Graphics processor 120 also controls write operations of graphics data to frame buffer 130.

Graphics engine 200 generates pixel data which is to be stored in frame buffer 130. This pixel data is temporarily stored in pixel data storage unit 210. Concurrently, graphics engine 200 generates mask data associated with each 64 bits or 8 byte word of pixel data via data lines 301 to be temporarily stored in byte enable storage unit 220. The mask data or byte enable data is used to determine whether data already written to frame buffer 130 will be overwritten by new pixel data stored in pixel data storage unit 210.

Graphics engine 200 initiates a packet transfer of data to frame buffer 130 when all pixel data to be transferred to frame buffer 130 has been written to pixel data storage unit 210. All data transfers during a packet transfer are 64 bits wide. To perform a packet transfer, 64 bits or 8 bytes of mask (byte enable) data is transferred from byte enable data storage unit 220 via data lines 305 to frame buffer 130.

On each successive clock cycle, one 64-bit word of pixel data is transferred from pixel data storage unit 210 to frame buffer 130. If the pixel data to be written to frame buffer 130 crosses one or more tile boundaries, then two or more packet requests are needed since the pixel and mask data are stored in physically distinct locations in frame buffer 130.

This implies that a 64-bit word of byte enable data temporarily stored in byte enable data storage unit 220 may contain data for two packet requests. Thus, during a first packet request, 64 bits of byte enable data are transferred from byte enable storage unit 220 on the first clock cycle and one 64 bit word of pixel data is transferred on each successive clock cycle, until the first packet request is complete. As data is read from the pixel data storage unit 210 on each clock cycle, the byte enable data in byte enable data storage unit 220 is shifted by one byte on each clock cycle. The shifting of data in byte enable data storage unit 220 is described in detail in FIG. 8. By shifting byte enable data in the byte enable storage unit 220, the present invention prevents the loss of byte enable data, as encountered in the prior art, after the first packet is completed.

During the second packet request, since the byte enable data has been shifted within the byte enable data storage unit 220, the Least Significant Byte will correspond to the next 64 bit word to be read out of the pixel data storage unit 210. This allows 64 bits of data to be transferred on the first clock cycle and one 64 bit word of pixel data to be transferred on each successive clock cycle until the second packet request is complete.

Figure 3:
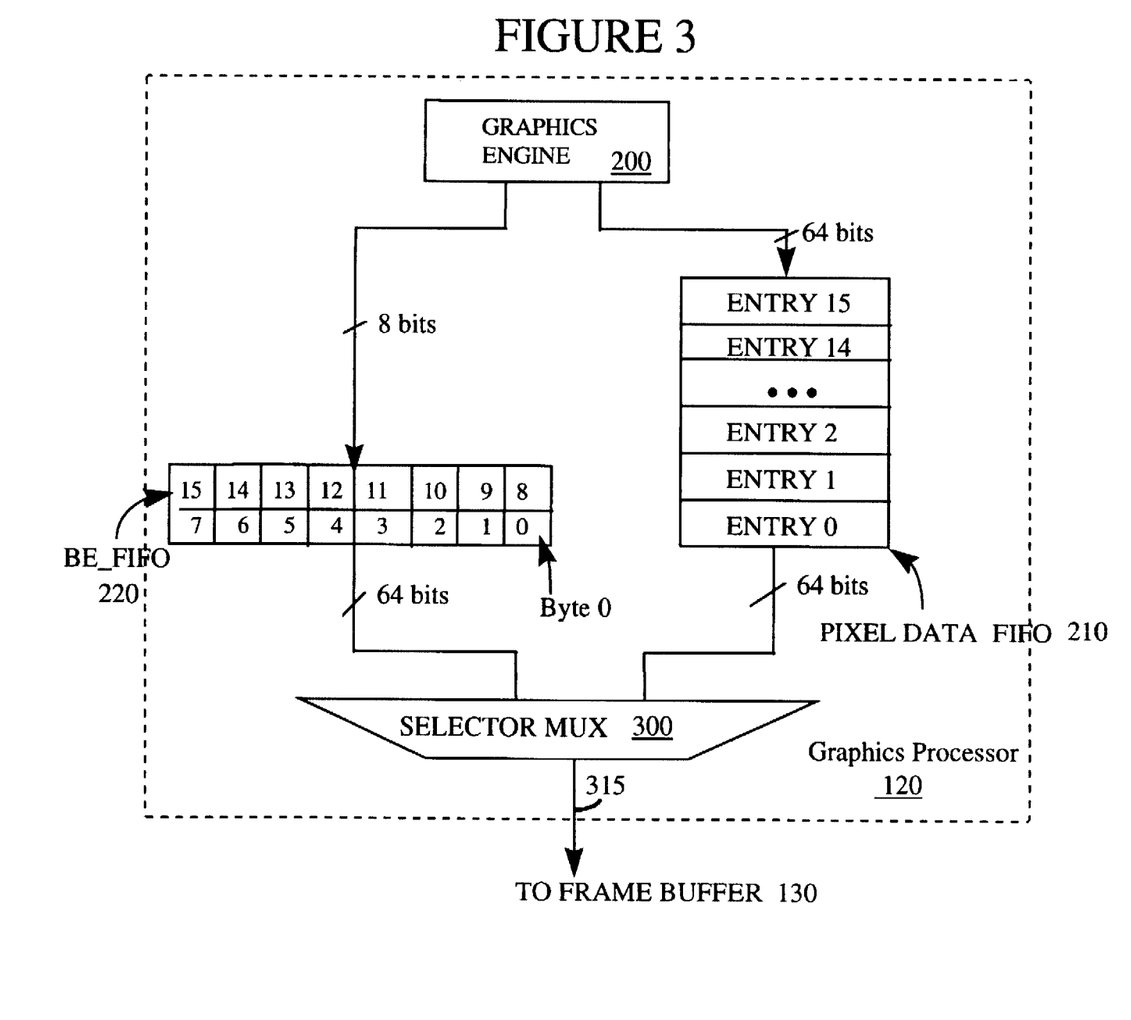
FIG. 3 is a simplified block diagram illustrating the architecture of the byte enable unit and the pixel data storage unit in the graphics processor of the present invention.

FIG. 3 is a simplified block diagram illustrating the architecture of graphics processor 120 including pixel data storage unit (DATA_FIFO) 210 and byte enable data storage unit (BE_FIFO) 220. As shown in FIG. 3, both storage units 210 and 220 receive inputs from Graphics engine 200 in graphics processor 120. And the outputs of the storage units couple to a data selection unit i.e., MUX 300. In addition to storing pixel data and byte enable data, pixel data storage unit 210 and byte enable storage unit 220 may also facilitate data transfers to frame buffer 130. BE_FIFO 220 may allow the pixel path in graphics processor 120 to make maximum use of the data transfer protocol of frame buffer 130 by allowing a maximum amount of data to be transferred during a frame buffer transfer cycle.

Graphics engine 200 may include a transparency unit (not shown) which takes as its inputs the background color of the display screen in display unit 140, a bit mask which may be used for system bus access, an equal or not_equal operand, and actual data which may be eventually stored in frame buffer 130. Graphics engine 200 further includes logic which performs a write or not_write operation received in the transparency unit to determine which pixel in frame buffer 140 may or may not be overwritten. Graphics engine 200 generates an 8 bit wide write enable mask which is stored in BE_FIFO 220 and a 64 bit pixel data which is stored in DATA_FIFO 210.

DATA_FIFO 210 may receive and store 16 entries of 64 bit wide pixel information representing pixel data to be displayed in display unit 140. BE_FIFO 220 may store 16 entries of information with each entry being 8 bits (1 byte) wide. Each byte of data stored in BE_FIFO 220 may include write/not_write information corresponding to each 64 bit entry in pixel data storage unit 210. Each of the 8 bits of data in each entry of BE_FIFO 220 may control the write/not_write attribute for a byte of pixel data in DATA_FIFO 220.

In one embodiment of the present invention, 64 bits of pixel data may be processed at a time requiring one byte of write enable data to be generated for each 64-bit word of pixel data in DATA_FIFO 210. Graphics processor 120 provides pop signals to both DATA_FIFO 210 and BE_FIFO 220 to remove pixel data and byte enable information from the storage units as they are used. The outputs of BE_FIFO 220 and DATA_FIFO 210 couple to the input of multiple input multiplexor (MUX) 300.

MUX 300 logically selects whether pixel data or byte enable data may be driven to frame buffer 130 depending on the masking information contained in the byte enable data stored in BE_FIFO 220. MUX 300 drives an output signal 315 comprising byte enable and pixel data information to be stored in frame buffer 130.

The preferred embodiment of the present invention imposes two restrictions on the transfer of data from MUX 300 to memory. The first restriction requires the collection of words of 64 bit pixel data and bytes of write enable data so as to optimize data transfer to memory.

The second restriction requires data transfers to the memory controller (not shown) must be 64 bits (8 bytes) wide. This means that since data stored in DATA_FIFO 210 is already 64 bits wide, the write enable data stored in BE_FIFO 220 must also be 64 bits wide.

In the preferred embodiment, write enable data and pixel data may be transferred by first transferring all appropriate byte enable data to the memory controller and subsequently transferring all appropriate pixel data from DATA_FIFO 210.

Figure 4:
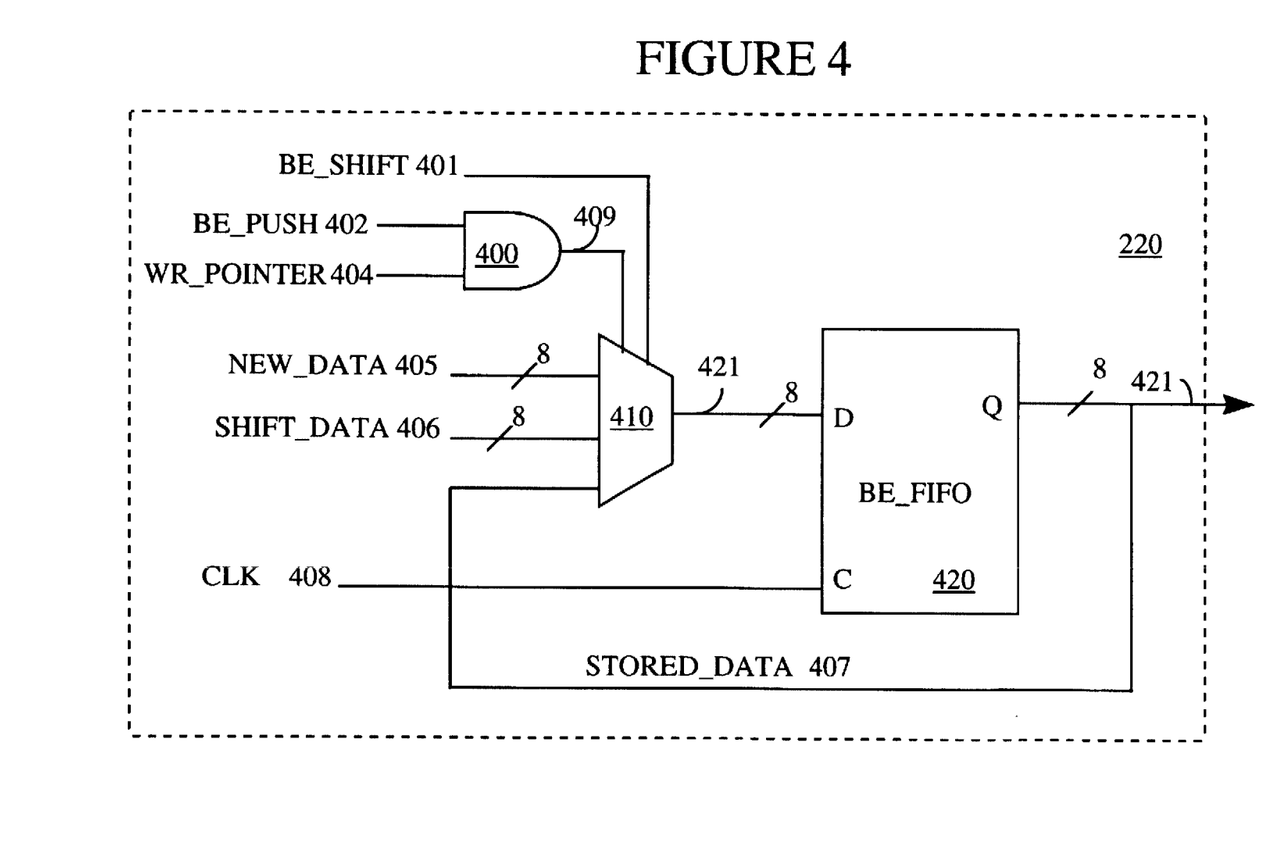
FIG. 4 is a simplified block diagram of the internal circuitry of the byte enable FIFO register of the present invention.

FIG. 4 is a block diagram depicting in detail one embodiment of byte enable data storage unit 220 of the present invention. In the preferred embodiment of the present invention, the architecture of byte enable data storage unit 220 may comprise two independent 64 bit (8 byte) registers. Each of these registers may comprise a group of eight bytes with each byte capable of being independently loaded with new data.

Continuing with reference to FIG. 4, an example of a 1 byte slice of one of the BE_FIFO 220 registers of the present invention is shown. The example illustrated in FIG. 4 comprises an AND gate 400, a multiple input multiplexor (MUX) 410, and a storage unit (BE_FIFO) 420.

AND gate 400 receives as its inputs BE_PUSH signal 402, and WRITE_PTR signal 404. AND gate 400 includes logic which may be used to generate an output signal 409 to MUX 410 which will be active if both of the input signals to AND gate 400 are asserted high. BE_PUSH signal 402 is asserted high to load new data to BE_FIFO 420. WRITE_PTR signal 404 selects which byte is to receive the new data.

MUX 410 is coupled to the input of BE_FIFO 420 (i.e., D input) via output signal 421. MUX 410 receives as one of its inputs NEW_DATA 405 signal from graphics processor 120. NEW_DATA 405 signal supplies new data to storage unit 420. MUX 410 also receives as an input SHIFT_DATA 406 signal supplied by graphics processor 120.

SHIFT_DATA 406 signal comprises data from the output port of previous storage units. MUX 410 may further receive as an input STORED_DATA 407 signal from the Q output of BE_FIFO 420 representing data already retained in BE_FIFO 420. BE_PUSH 402 signal and BE_SHIFT 401 signal couple to MUX 410 to enable new data to be written to BE_FIFO 420.

BE_FIFO 420 may be an 8-bit register for storing byte entries associated with pixel data stored in pixel data storage unit 210 shown in FIG. 2. BE_FIFO 420 may be a flip-flop register with a D input for receiving input signals to BE_FIFO 420, a clock input (C) for receiving system clock signals to clock input signals received in BE_FIFO 420, and a Q output to drive output signals out of BE_FIFO 420.

BE_FIFO 420 receives at its D input an 8 bit output signal of MUX 410 and drives out of its Q output data out signal 421 to frame buffer 130. BE_FIFO 420 loads byte enable data associated with 64 bits of pixel data stored in pixel data storage unit 210, if the WR_POINTER signal 404 points to another byte slice, then the data in this byte slice remains unchanged.

BE_FIFO 420 may operate as a loadable storage register. In other words, new data may be loaded into BE_FIFO 420 or previously loaded data may be retained in BE_FIFO 420. Load operations in BE_FIFO 420 may be performed by asserting BE_PUSH 402 signal.

When BE_PUSH 402 signal is asserted high by graphics processor 120, new data is clocked onto the D input of BE_FIFO 420 to be stored therein. When BE_PUSH 420 signal is asserted low, previously loaded data (i.e., Q output of storage unit 420) is fed back around to the D input of BE_FIFO 420 thereby preserving the present data in BE_FIFO 420 and retaining the data until requested by frame buffer 130 during a subsequent frame buffer 130 transfer cycle.

Figure 5:
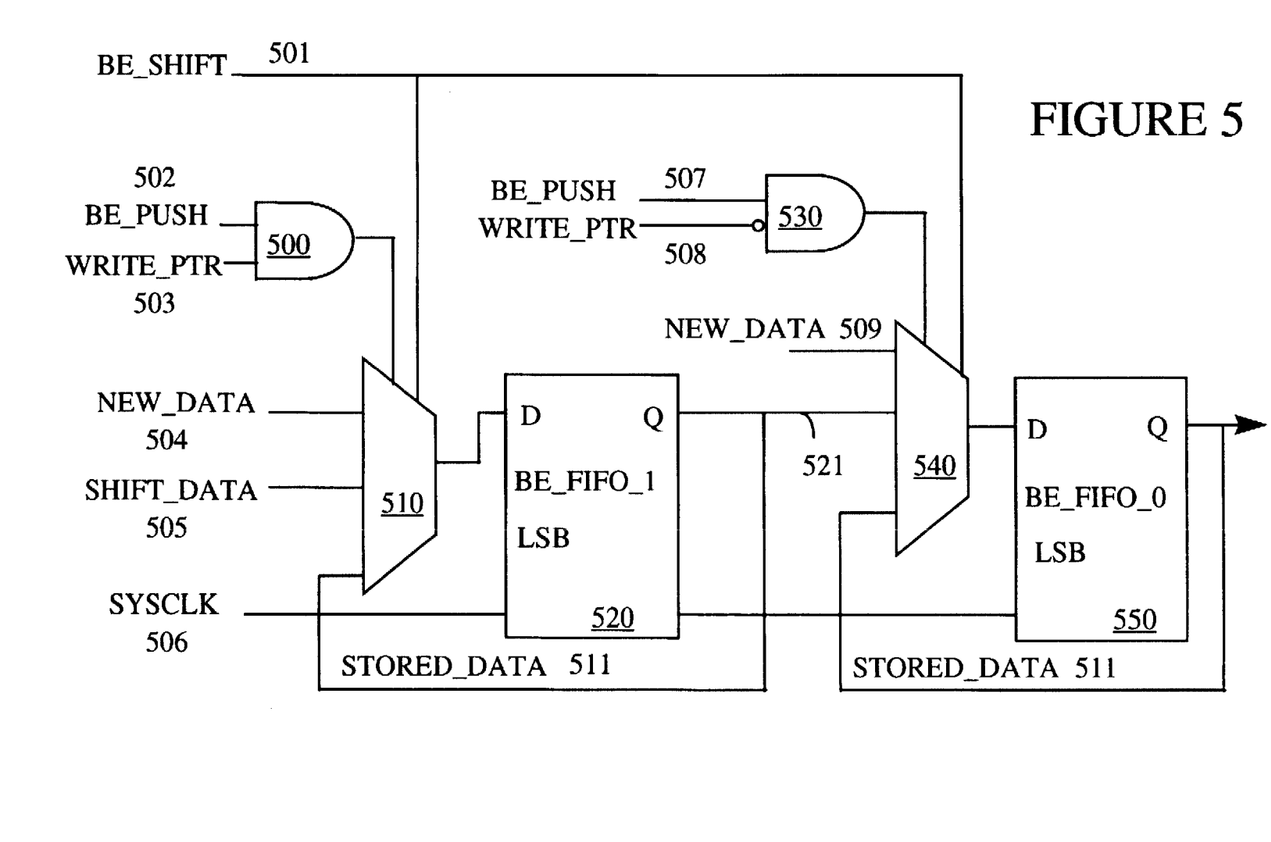
FIG. 5 is a simplified block diagram illustrating an exemplary circuitry of two byte enable FIFO registers of the present invention joined together.

FIG. 5 is a simplified block diagram depicting one embodiment of two byte slices of the byte enable storage unit 220 of the present invention joined together. The byte slices shown in FIG. 5 comprise two byte enable storage units i.e., BE_FIFO_1 520 and BE_FIFO_0 550, a plurality of multiple input multiplexors 510 and 540, a plurality of AND gates 500 and 530, a plurality of input signals 501 through 509, and output signals 521 and 522.

In the illustrated embodiment, AND gate 500 is coupled to receive as its inputs a BE_PUSH signal 502 and WRITE_PTR signal 503. BE_PUSH signal 502 and WRITE_PTR 503 are logically ANDed by AND gate 500 to generate an output signal which is coupled to MUX 510 to enable new data to be written to storage unit 520.

MUX 510 receives as its inputs NEW_DATA signal 504, SHIFT_DATA signal 505, and STORED_DATA signal 506. MUX 510 generates an output signal to the D input of BE_FIFO_1 520 to write new data from storage unit 520 to storage unit 550. BE_FIFO_1 520 receives and stores new data generated by graphics processor 120 via MUX 510 at its D input and drives the stored data out its Q input to MUX 540. BE_FIFO_1 520 is clocked by SYSCLK signal 506.

AND gate 530 receives as its inputs BE_PUSH signal 507 supplied by graphics processor 120 and WRITE_PTR signal 508 which is asserted by byte enable unit 220 to write new data to storage unit 550. AND gate 530 supplies an output signal to couple AND gate 530 to MUX 540.

MUX 540 receives as its inputs output signal 521 from storage unit 520, NEW_DATA signal 509 from graphics processor 120, and BE_SHIFT signal 501. When asserted high, BE_SHIFT signal 501 enables data stored in storage unit 520 to be shifted into storage unit 550. MUX 540 supplies an output signal which couples MUX 540 to the D input of storage unit 550.

BE_FIFO_0 550 supplies STORED_DATA 511 to frame buffer 130. In the illustrated embodiment, BE_FIFO_1 520 and BE_FIFO_0 550 are wired together via BE_SHIFT signal 501. Thus, when graphics processor 120 asserts BE_SHIFT signal 501, BE_FIFO_0 550 is enabled to be filled with data previously held in BE_FIFO_1 520, thus shifting the data.

In the embodiment described in FIG. 5, a simple addressing scheme has being developed to control the loading of data from storage unit 520 to storage unit 550. This addressing scheme is implemented by assigning a pointer that indicates which entry in the storage units may be loaded.

When WRITE_POINTER signals 503 and 508 are asserted in succession, BE_PUSH signals 502 and 507 are enabled in succession to allow byte writes to storage units 520 and 550 respectively. When one byte of masking data has been written, the pointer is advanced to enable the next byte write. This operation is repeated until all the byte enable data associated with the pixel data in pixel data FIFO 210 has been loaded.

Figure 6:
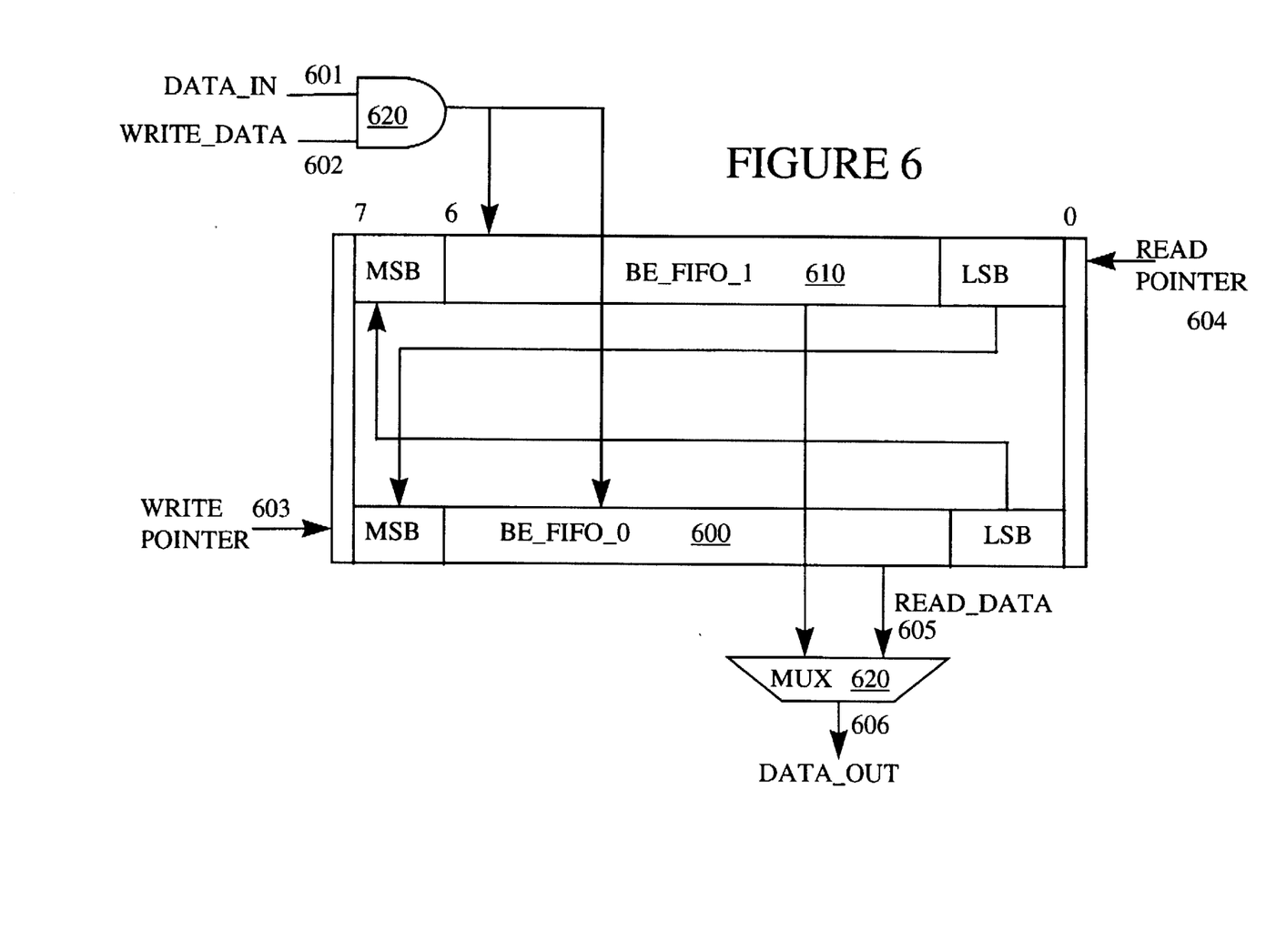
FIG. 6 is a simplified block diagram illustrating the read/write structure of the byte enable FIFO of the present invention.

FIG. 6 illustrates one embodiment of the byte enable First-In-First-Out structure and loading mechanism of the present invention. The BE_FIFO 220 structure illustrated in FIG. 6 comprises the two storage units discussed in FIG. 4 (i.e., storage units 600 and 610, MUX 620, and signal lines 601 through 606. The structure of storage units 600 and 610 may comprise 8 bytes of storage locations (e.g., LSB and MSB) to store byte enable data presented by graphic engine 200 to byte enable unit 220.

Referring to FIG. 6, storage unit 600 and 610 include locations to store the Least Significant Byte (LSB) through the Most Significant Byte (MSB) of byte enable data presented to byte enable unit 220. Storage units 600 and 610 receive DATA_IN signal 601 from graphics engine 200. WRITE_DATA signal 602 coupled with WR_POINTER signal 603 to determine which byte of storage unit 600 or 610 will be written.

The BE_FIFO structure may also include a read pointer 604 which couples to storage unit 600 and storage unit 610. READ_DATA signal 605 couples storage unit 600 and 610 to MUX 620. MUX 620 drives requests of byte enable data out to frame buffer 130.

Figure 7:
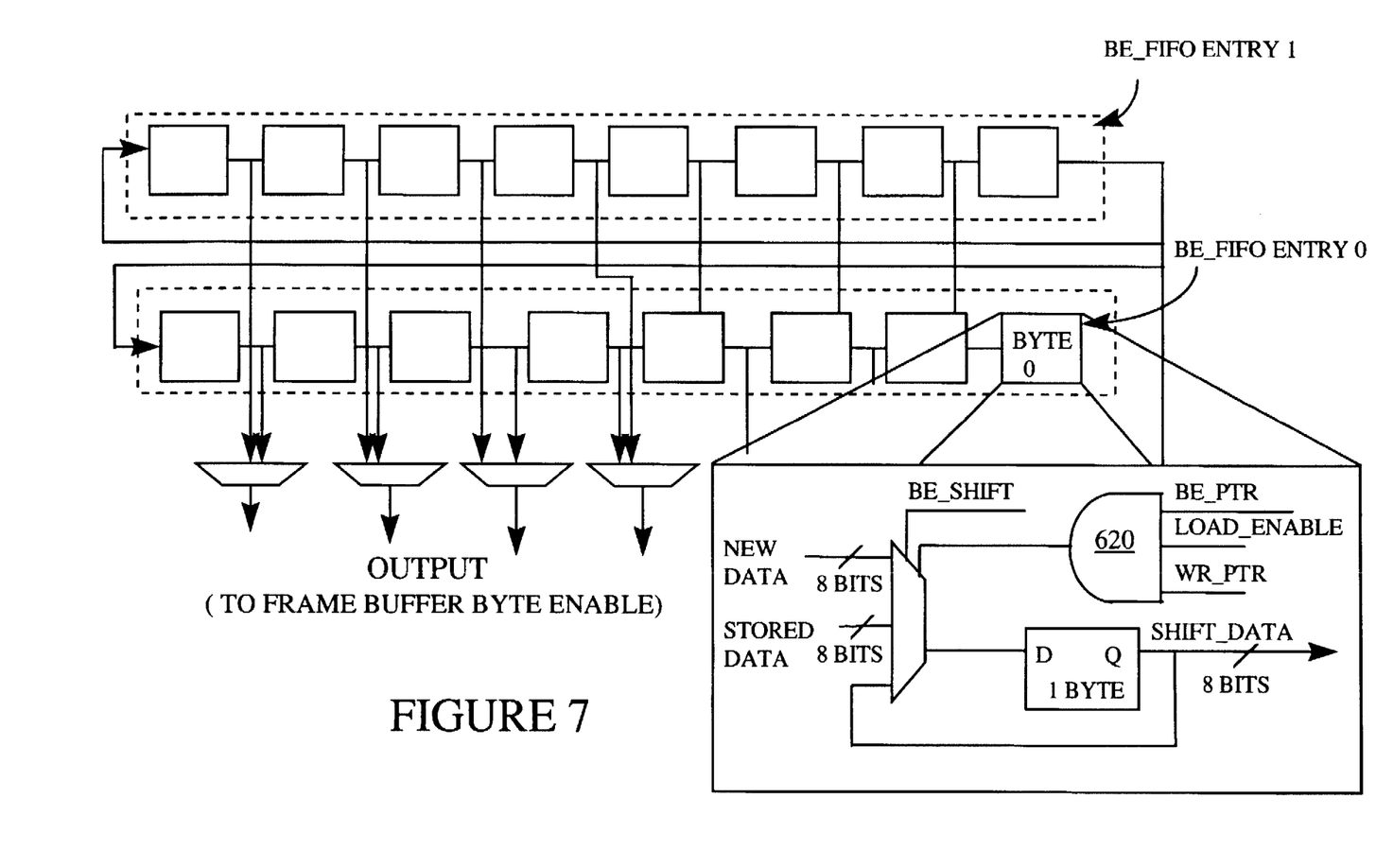
FIG. 7 is a block diagram illustrating the circular shift register configuration of the byte enable FIFO of the present invention.

FIG. 7 illustrate one embodiment of the byte enable unit of the present invention. The embodiment illustrated in FIG.

7 is an example of byte enable unit 220 configured as a shift register. Referring to FIG. 7 with reference to FIG. 4, byte enable unit 220 may be configured to perform as a shift register. The shift register operation is performed by using BE_SHIFT signal 401 described in FIG. 4. When BE_SHIFT 401 is asserted high, the Q output of one byte-wide storage unit is fed directly to the D input of the next byte wide storage unit so that on the positive edge of the system clock the data stored in one byte-wide storage gets shifted to the next byte-wide storage unit.

Additionally, the Q output of the least significant byte storage location of storage unit 420 is connected to MUX at the D input of the most significant byte storage location of storage unit 450 thereby creating a 16 byte loadable circular shift register. BE_SHIFT signal 401 signals for each storage unit are wired together so that when the BE_SHIFT signal goes high a circular shifting of data take places.

Figure 8:
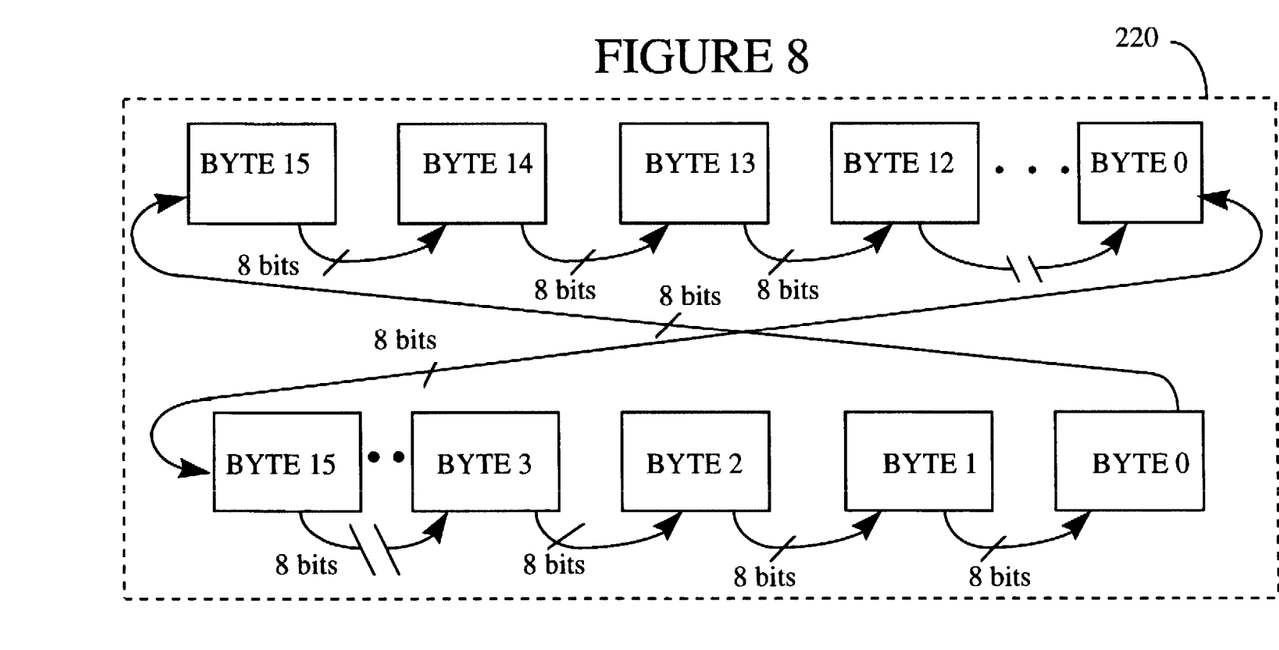
FIG. 8 is a simplified diagram illustrating the series of steps required to accomplish the goals of the present invention.

FIG. 8 is simplified block diagram illustrating the flow of data in one embodiment of the byte enable storage unit 220 of the present invention. The illustration in FIG. 8 shows the 16 storage locations that comprise the BE_FIFO 220 which may be loaded with byte enable data during the positive edge of the graphics system's clock.

Continuing with reference to FIG. 8 and FIG. 4, the flow of data through BE_FIFO 220 is implemented by monitoring the pop signals presented by graphics processor 120 to BE_FIFO 220 and DATA_FIFO 210. To initiate the loading of new data into the register locations of BE_FIFO 220, BE_FIFO 220 checks the pop signal to determine if the signal has being asserted high or not. If the byte enable pop signal is asserted high (BE_POP=1) then BE_FIFO 220 checks the pop pointer (POP_PTR) and places the FIFO entry contents at which the POP_PTR in pointing out on the output bus and increments the POP_PTR to point at the next FIFO entry. If the BE_POP signal is not 1 then either a PUSH (load operation) or a shift operation or a hold (do nothing) operation is performed.

If BE_POP=0 (indicating a no pop operation), BE_FIFO 220 checks BE_SHIFT 401 and BE_PUSH 402 signals to determine whether new data will be loaded or whether previously stored data will simply be shifted from one register location to another.

In circumstances where new data has to be loaded onto BE_FIFO 125 (i.e. BE_PUSH=1), BE_FIFO 220 checks the BE_FIFO 220 entry pointer to determine which BE_FIFO 220 entry will be loaded. Once the FIFO entry to be loaded has been determined, BE_FIFO 220 checks the byte pointers (i.e. LOAD_ENABLE signal 403) to determine which byte in BE_FIFO 220 entry will get the new data. If previously stored data is to be shifted from one register location to another (i.e. BE_SHIFT signal 401=1) then the loading mechanism in BE_FIFO 220 shifts data in 8 bits (1 byte) quantities from the most significant byte position to the least significant byte position as illustrated in FIG. 8.

In one embodiment of the present invention, BE_FIFO 220 performs a shifting operation on the system clock's edge with only 1 byte of data being shifted per clock. If it is necessary to shift the data by 3 bytes, then BE_SHIFT signal 401 would have to remain high for three system clock cycles.

Thus, a method and apparatus is presented for transferring pixel data information from a data storage unit to a tile based frame buffer without overwriting data already stored in such tiles. From the above description, it will be apparent that the invention disclosed herein provides a novel and advantageous method and apparatus for executing pixel information in a computer system. The foregoing discussion discloses and describes exemplary methods and embodiments of the present invention. As will be understood by those familiar with the art, the invention may be embodied in other specific forms without departing from its spirit or essential characteristics, and thus, the described embodiment is not restrictive of the scope of the invention. For example, the invention could be used with any microprocessor platform, including Intel's X86, the Power PC™, DEC Alpha™, etc., and could be used with any instruction set. The following claims are indicative of the scope of the invention. All variations which come within the meaning and range of equivalency of the claims are to be embraced within their scope.

What is claimed is:

1. A graphics processor for ensuring data consistency during a data write operation to a tile based frame buffer when said data crosses a tile boundary in said frame buffer, said graphics processor comprising:

(a) a first data storage unit for storing data representing a plurality of pixel information to be stored in said frame buffer, said pixel information crosses multiple tile boundaries in said frame buffer;

(b) a second data storage unit for storing portions of mask data associated with said pixel information for preventing said pixel information from overwriting data previously written in said frame buffer, said mask data being shifted within said data storage unit to prevent the loss or corruption of said mask data after portions of said pixel information has been written to said frame buffer; and (c) means for selectively determining a portion of said pixel information to be overwritten in said frame buffer.

2. The graphics processor of claim 1 wherein said second data storage unit comprises data storage locations for storing data of at least 8 bits wide.

3. The graphics processor of claim 2 wherein said data stored in said second storage unit includes write/not_write data associated with pixel data in said first storage unit.

4. The graphics processor of claim 3 wherein said second storage unit includes at least one first-in-first-out register.

5. The graphics processor of claim 4 wherein said portions of data stored in said second data storage unit includes byte enable data associated with each of said pixel data.

6. The graphics processor of claim 5 wherein said byte enable data controls write operation of said pixel information to said frame buffer.

7. A write enable circuit for controlling write operations of pixel data to a tile based frame buffer when said pixel data crosses a tile boundary in said frame buffer, said circuit disposed within an integrated circuit for processing graphics data and information, said circuit comprising:

(a) a plurality of logic gates having a plurality of inputs for receiving and generating portions of byte enable data representing portions of said pixel data;

(b) a plurality of input signal selectors having a plurality of inputs coupled to the outputs of said logic gates to receive said outputs of said logic gates;

(c) a plurality of storage units coupled to said signal selectors for receiving and storing byte enable data associated with said pixel data;

(d) a plurality of output signal selectors having a plurality of inputs for driving byte enable data to said frame buffer; and (e) means for transmitting a data load and shift signal to respectively load and shift data in and through said storage unit.

8. The circuit of claim 7 wherein said logic gates include a plurality of AND gates.

9. The circuit of claim 8 wherein said storage units include a plurality of storage locations for storing said byte enable data, each of said storage locations being at least 8 bits wide.

10. The circuit of claim 9 wherein said plurality of input signal selectors selectively generates new data in response to said means of transmitting to said storage locations.

11. The circuitry of claim 10 wherein said storage unit stores and writes said byte enable data on a first-in first-out basis.

12. The circuit of claim 11 wherein said byte enable data includes masking information indicating portions of said pixel data to be written in said frame buffer.

13. The circuit of claim 12 wherein said storage locations further includes means for retaining data previously stored in said storage locations.

14. In a computer system having a graphics processor for processing graphics information, said graphics information being written to a tile-based frame buffer, wherein said graphics information crosses a tile boundary in said frame buffer, an improvement comprising:

data storage means for receiving and storing mask data for determining which portions of said graphics information will be overwritten in said frame buffer when said graphics information crosses said tile boundary, said data storage means temporarily storing portions of said mask data associated with said graphics information when said graphics information crosses said tile boundary to prevent said graphics information from being corrupted when written to said frame buffer.

15. The improvement of claim 14 wherein said data storage means includes first-in-first-out registers for storing byte enable data associated with said graphics information written to said frame buffer.

16. A method executing pixel data in a graphics processor to prevent pixel data overwrites to a tile-based frame buffer when said pixel data traverse tile boundaries in said frame buffer, the method comprising the steps of:

(a) receiving pixel data to be stored in said frame buffer;

(b) receiving byte enable data associated with said pixel data from a data source;

(c) storing said byte enable data in a plurality of storage locations;

(d) determining whether said pixel data crosses a tile boundary when written to said frame buffer;

(e) writing said byte enable data to said frame buffer upon a write request to write said pixel data to said frame buffer; and (f) retaining a portion of said byte enable data which will be subsequently written to said frame buffer with a second portion of said pixel data if said write request of pixel data traverses multiple tile boundaries in said frame buffer.

17. The method of claim 16 wherein said storage locations includes a plurality of data pop signals which are monitored to determine whether data should be written to said frame buffer.

18. The method of claim 16 wherein said storage locations include a plurality of data shift signals to shift said byte enable data within said storage locations.

19. The method of claim 16 further including the step of asserting high the pop signals to write data out of said storage locations in response to data request crossing tile boundaries in said frame buffer.

20. The method of claim 16 further including the step of shifting said byte enable data within said storage locations to write a first packet of information to said frame buffer while maintaining the validity of said byte enable data.

21. The method of claim 16 further including the step of aligning said byte enable data in said storage location in order to write a second packet of data to said frame buffer when said pixel data traverses a tile boundary.

* * * * *